United States Patent [19]
Niemann et al.

[11] Patent Number: 5,799,205
[45] Date of Patent: Aug. 25, 1998

[54] TRANSFER SYSTEM FOR DATA EXCHANGE USING TWO ACTIVE CENTRAL PROCESSING UNITS DIRECTLY CONNECTED TOGETHER PARALLEL TO SERIAL SYSTEM BUS DIRECTLY CONNECTING CPUS TO DISPERSED DEVICES

[75] Inventors: Karl-Heinz Niemann; Michel Helmut, both of Hanover, Germany

[73] Assignee: Mannesmann Aktiengesellschaft, Dusseldorf, Germany

[21] Appl. No.: 641,949

[22] Filed: May 2, 1996

Related U.S. Application Data

[63] Continuation of Ser. No. 153,671, Nov. 16, 1993, abandoned.

[30] Foreign Application Priority Data

Nov. 13, 1992 [DE] Germany .................. 42 38 957

[51] Int. Cl.⁶ .................. G06F 13/12; G06F 13/362
[52] U.S. Cl. .................. 395/840; 395/847; 395/864; 370/16; 370/58.1
[58] Field of Search .................. 370/58.1, 16; 395/840, 395/841, 847, 864

[56] References Cited

U.S. PATENT DOCUMENTS

| | | | |
|---|---|---|---|
| 5,088,053 | 2/1992 | Sprague et al. | 395/166 |
| 5,253,348 | 10/1993 | Scalise | 395/325 |
| 5,263,163 | 11/1993 | Holt et al. | 395/725 |
| 5,265,211 | 11/1993 | Amini et al. | 395/325 |
| 5,280,621 | 1/1994 | Barnes et al. | 395/800 |
| 5,339,442 | 8/1994 | Lippincott | 395/725 |
| 5,434,976 | 7/1995 | Tan et al. | 395/200.01 |
| 5,463,619 | 10/1995 | Van Steenbrugge et al. | 370/58.1 |
| 5,479,395 | 12/1995 | Goodman et al. | 370/16 |

*Primary Examiner*—Thomas C. Lee
*Assistant Examiner*—Rehana Perveen
*Attorney, Agent, or Firm*—Cohen, Pontani, Lieberman, Pavane

[57] ABSTRACT

A transfer system for the exchange of data between dispersed devices in stored program controls with feedback over the process that is to be controlled. For the real time data transfer between a plurality of central processing units as well as between I/O components and the respectively allocated central processing units, aside from a system bus with nonpersistent access behavior, at least one lateral bus is provided, the transfer protocol of which includes a priority-persistent access behavior and at which at least two central processing units are connected. Moreover, at least one I/O bus is allocated to each central processing unit. The transfer protocol of the I/O bus, which is connected to at least one I/O device, includes a priority-persistent access behavior. Devices for configuring, controlling and observing are connected to the system bus in the waiting area. Sensors and actuators are connected to the I/O devices.

4 Claims, 8 Drawing Sheets

TRANSFER SYSTEM FOR DATA EXCHANGE USING TWO ACTIVE CENTRAL PROCESSING UNITS DIRECTLY CONNECTED TOGETHER PARALLEL TO SERIAL SYSTEM BUS DIRECTLY CONNECTING CPUS TO DISPERSED DEVICES

This is a continuation, of application Ser. No. 08/153, 671, filed Nov. 16, 1993, now abandoned.

BACKGROUND OF THE INVENTION

1. Field of the Invention

The invention relates to a transfer system for the exchange of data between dispersed devices in stored program controls with feedback over the process that is to be controlled.

2. Description of the Prior Art

In stored program controls for process control, process-specific input parameters (measured values) are linked to specified process parameters, so-called markers. The results of this linking are put out as output parameters to actuators, which affect the course of the process to be controlled as a function of the input parameters.

The devices of the stored program controls are placed in the vicinity of the process, in order to keep the transfer lines between the sensors and actuators, on the one hand, and the stored program control, on the other hand, as short as possible.

In a so-called waiting area, spatially separated from the process, control and observation equipment, as well as equipment for configuring the stored program control are provided.

The control and observation equipment, as well as the equipment for the configuration are connected with one another and with the stored program control over a serial bus. The configuration data of equipment for configuring the stored program control are transferred over this bus to the stored program control and measured values and control data are transferred from stored program control to the control and observations equipment. Moreover, control commands are transferred from the control equipment to the stored program control.

Because of the spatial distance between the stored program control and the equipment and devices in the waiting area and because of its high data-transmission rate, the ETHERNET bus system, standardized in DIN/ISO 8802, part 3 and referred to in the following as system bus, is frequently used for this bus.

The stored program control consists essentially of a central processing unit, which is connected with a bus controller to the connection at the system bus and a plurality of input and output components. The sensors are connected to the input components and actuators are connected to the output components.

The processing capacity of the central processing unit is limited by the modular units. Depending on the number of the actuators and sensors specifically required by the process, as well as on the frequency with which they are polled or operated consecutively, it is necessary to provide a plurality of central processing units, each of which is connected to the system bus.

Depending on the spatial arrangement specific to the process, the sensors and actuators allocated to a control sequence are connected to input and output components of different central processing units. Accordingly, the measured values or output parameters must be transferred to the respective other, responsible central processing unit. Particularly for processes where time is critical, this transfer of data must be realized with so-called real time behavior. This means that time delays are to be avoided between the, determination of the measured values and their transfer to the assigned central processing unit or between the generation of the setting value in the central processing unit in question and the transfer of the setting value to the central processing unit, to the output component of which the corresponding actuator is connected. Moreover, measured values and setting values must be transferred between the respective input or output component and the associated central processing unit in real time.

Because of its transfer protocol, the system bus connecting the central processing units is unsuitable for real time data transfer because ETHERNET is tied to a nonpersistent access method.

SUMMARY OF THE INVENTION

Accordingly, it is an object of the present invention to provide a transfer system for the exchange of data between dispersed devices in stored program controls, which permits a real time transfer of data between a plurality of central processing units as well as between input or output components and each of the allocated central processing units, without interfering with the exchange of data between the central processing units and the observation, operation and configuration devices.

Pursuant to this object, and others which will become apparent hereafter, one aspect of the present invention resides in a transfer system having a system bus with a nonpersistent access method, to which all central processing units, control, observation and configuration equipment is connected, to which at least one lateral bus is provided whose transfer protocol comprises a priority-persistent access method and at which exclusively, at least two central processing units are connected. Moreover, allocated to each central processing unit is at least one further whose transfer protocol comprises a priority-persistent access method and at which, in each case, at least one input or one output component is connected.

For this purpose, within the scope of the configuration of the stored program control of each information to be transferred, whether it be measured values, setting values, interim results or markers, a rank is allocated in the form of a priority.

The attempt of several devices capable of transmitting to access the bus to which they are connected thus always ends with the transfer of the information with the highest priority. In this way, a priority-dependent, real time transfer of data between the facilities, connected to one of the buses with a priority-persistent access method, can be realized.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
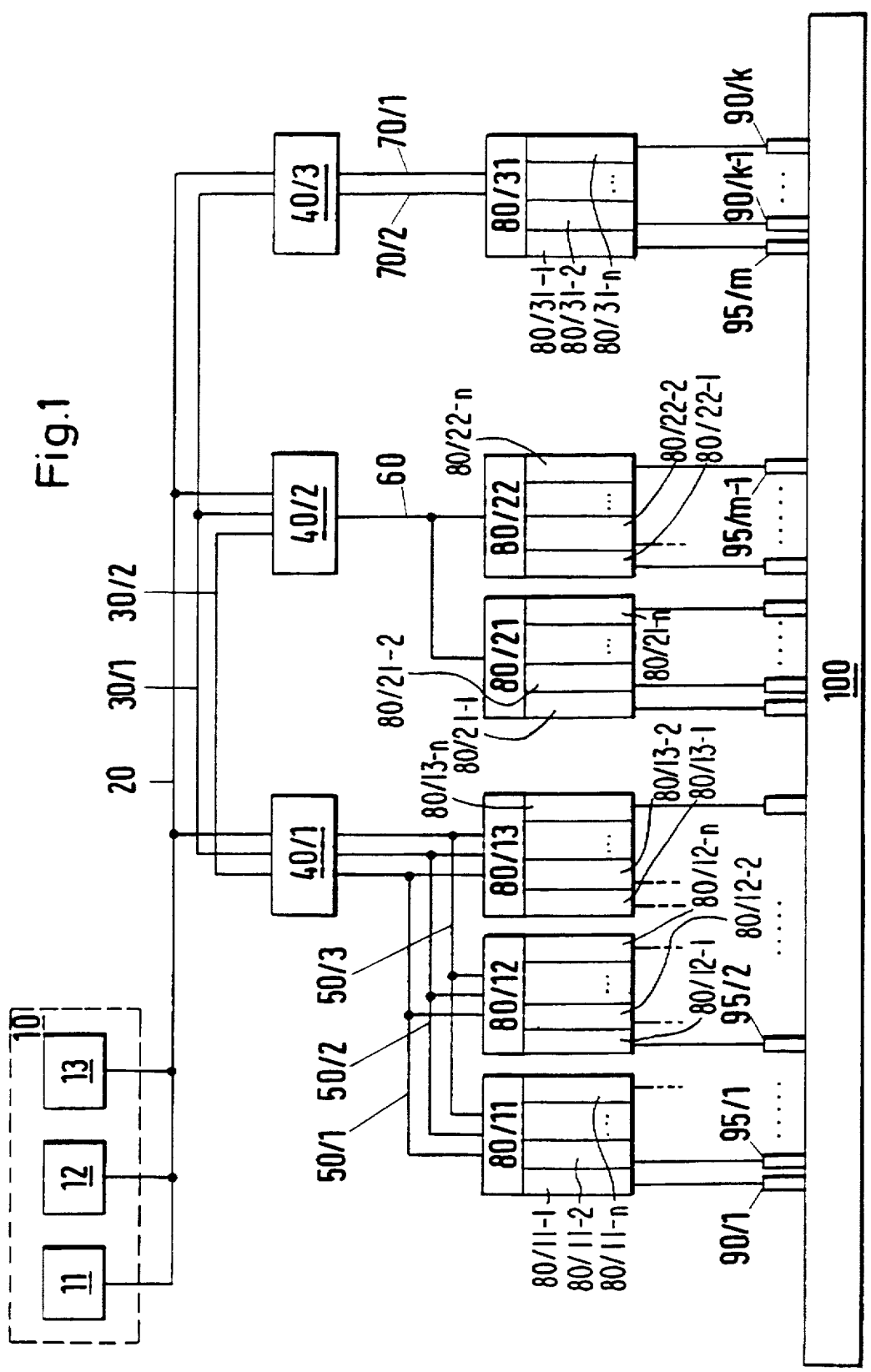
FIG. 1 shows a basic representation of the arrangement and inventive linking of components of a stored program control.

As shown in FIG. 1, a number k of sensors 90/1 to 90/k and a number m of actuators 95/1 to 95/m are connected with a spatially extended process 100, shown in stylized form. Each sensor 90/1 to 90/k and each actuator 95/1 to 95/m is connected to one of n connecting units 80/11-1 to 80/31-n of a nearby input/output device 80/11 to 80/31, referred to hereinafter as I/O devices. In this connection, a differentiation is made between connection units for the input of data and connection units for the output of data. The sensor 90/1 is connected to the connection unit 80/11-1; the connection unit 80/11-1 is an input connection unit. The actuator 95/1 is connected to the connection unit 80/11-2; the connection unit 80/11-2 is an output connection unit.

Depending on the number and temporal order of operational sequences, a central processing unit 40 is allocated to at least one I/O device 80. Of the large number of possible combinations in FIG. 1, three allocations of I/O devices 80 to central processing units 40 are shown by way of example.

The central processing unit 40/1 is connected over three parallel, serial buses 50/1, 50/2 and 50/3, which are referred to hereinafter as I/O buses, with three I/O devices 80/11, 80/12 and 80/13. A circuit, so arranged, is particularly appropriate, if a plurality of data is to be transferred in the shortest time between the different connection units 80/11-1 to 80/13-n and the central processing unit 40/1 and the sequences of functions are only simple command sequences, that is, when the extent of the data transfer predominates over the extent of the data processing.

Each of the I/O buses 50/1, 50/2 and 50/3 is connected with each of the I/O devices 80/11, 80/12 and 80/13 allocated to the central processing unit 40/1. This ensures that, if necessary, data can be sent or received simultaneously by all I/O devices 80/11, 80/12, 80/13 that are connected, as well as after an appropriate request by one of the I/O devices 80/11, 80/12, 80/13, sent or received simultaneously over all I/O buses 50/1, 50/2 and 50/3. Moreover, the data transfer devices of the individual I/O buses 50/1, 50/2 and 50/3 can also be divided up for the data transfer between one of the I/O devices 80/11, 80/12 and 80/13, so that data from the central processing unit 40/1 to the corresponding I/O device, such as 80/12, can be transferred on two I/O buses, such as 50/1 and 50/2, and, at the same time, data from the I/O device 80/12 can be transferred over the I/O bus 50/3 to the central processing unit 40/1 or the reverse.

The central processing unit 40/2 is connected over one I/O bus 60 with two I/O devices 80/21 and 80/22. A linkage, so configured, is particularly suitable if, for controlling parts of the process 100, a series of sensors 90 and actuators 95 is to be connected, the extent of the data transfer of which is small in comparison to the data processing in the central processing unit 40/2. Measured values from the individual I/O devices 80/21 and 80/22 and setting values can be transferred separately and consecutively to the I/O devices 80/21 and 80/22.

The central processing unit 40/3 is connected over two parallel I/O buses 70/1 and 70/2 with a single I/O device 80/31. This configuration is particularly advantageous if, despite the relatively small total number n of sensors 90 and actuators 95 that can be connected, the process is such that the extent of the data transfer and the extent of the data processing are equally intensive. Measured values from the I/O device 80/31 to the central processing unit 40/3 or setting values from the central processing unit 40/3 to the I/O device 80/31 can be transferred simultaneously over both I/O buses 70/1 and 70/2. Moreover, measured values can be transferred over one of the I/O buses, for example, over 70/1, to the central processing unit 40/3 and at the same time, setting values can be transferred over the other I/O bus 70/2 to the I/O device 80/31.

The I/O buses 50/1 to 70/2 are bus systems with a transfer protocol, which permits a priority-persistent access of the connected transmitter to the bus, a transmitter being understood to be the central processing units 40 and the I/O device 80, which are connected to the respective I/O buses 50, 60 or 70. Preferably, bus systems according to the CAN standard corresponding to the draft standard ISO/DIS 11898 are used for the I/O buses 50/1 to 70/2.

A number of connection units 80/11-1 to 80/31-n are allocated to each I/O device 80/11 to 80/31. For the sake of greater clarity, exactly n connection units 80/11-1 to 80/11-n ... 80/31-1 to 80/31-n are allocated to these I/O devices 80/11 to 80/31 in FIG. 1. Within the scope of the concrete realization of the invention, the number n of connection units, in this case 80/11-1 to 80/11-n, allocated to an I/O device, for example, 80/11, depends on the design specifications and boundary conditions and can be different from I/O device to I/O device.

Beyond this, the central processing units 40/1 to 40/3 are connected to a system bus 20. According to FIG. 1, a configuration device 11, a control device 12 and an observation device 13 are connected in the waiting area 10 to each central processing unit 40/1 to 40/3. Usually, personal computers are used for these devices 11, 12 and 13. Depending on the process to be controlled, it may be advisable to combine the functional allocation of the devices 11, 12 and 13 in the waiting area. In this way, it is possible to combine the control and the observation functionally, so that one or more combined control/observing devices 12, 13 are connected to the system bus 20. If the process 100 permits it, the configuration of a stored program control can also be undertaken by a control/observing device.

The system bus 20 must satisfy high requirements with respect to the data transfer rate, the deterministic relationship between the event triggering the bus demand and the actual data transfer being of subordinate importance. Consequently, a bus system with nonpersistent access behavior, such as ETHERNET standardized as DIN/ISO 8802 part 3, is suitable.

Moreover, FIG. 1 shows a first lateral bus 30/1, to which all central processing units 40/1 to 40/3 are connected, and a second lateral bus 30/2, to which the central processing units 40/1 and 40/2 are connected. These lateral buses 30/1 and 30/2 have a transfer protocol with priority-persistent access behavior and serve for the real time transfer of data between the individual central processing units 40/1 to 40/3.

One or several lateral buses 30 are provided, depending on the extent of the data that is to be transferred between the central processing units 40.

For a stored program control shown in FIG. 1, a high data transfer volume specific to the process is to be expected between the central processing units 40/1 and 40/2. Accordingly, the central processing units 40/1 and 40/2 are connected over two lateral buses 30/1 and 30/2. On the other hand, a comparatively low data transfer volume specific to the process is to be expected between the central processing unit 40/3 and the central processing units 40/1 and 40/2, so that the connection of the central processing unit 40/3 to one of the lateral buses 30/1 and 30/2 satisfies the requirements. According to FIG. 1, the central processing unit 40/3 is connected to the lateral bus 30/1.

To illustrate the need for time-determined data transfer between the central processing units 40/1 to 40/3, the flow of information is explained by means of the following example.

The generation of a control sequence is scheduled in the central processing unit 40/1. The actuator 95/1 is one that can be addressed by this control sequence; the sensor 90/k is a data source for this control sequence. The sensor 90/k is connected to the input connection unit 80/31-n, which is connected over the I/O buses 70/1 and 70/2 with the central processing unit 40/3. The actuator 95/1 is connected to the output connection unit 80/11-2, which is connected over the I/O buses 50/1 to 50/3 with the central processing unit 40/1. This means that the measured value information is to be transferred from the sensor 90/k over the input connection unit 80/31-n of the I/O device 80/31, over one of the I/O buses 70/1 or 70/2, over the central processing unit 40/3 and over the lateral bus 30/1 to the central processing unit 40/1 and, moreover, as a function of the priority allocated to it and, as far as possible, without delay. In the central processing unit 40/1, this measured value information is processed and setting value information is generated. This setting value information is transferred in accordance with the priority allocated to it over one of the I/O buses 50/1 to 50/3 to the I/O device 80/11, which comprises the output connection unit 80/11-2. This process does not affect the system bus 20, on which data packages can be transferred simultaneously from or to devices in the waiting area 10.

Figure 2:
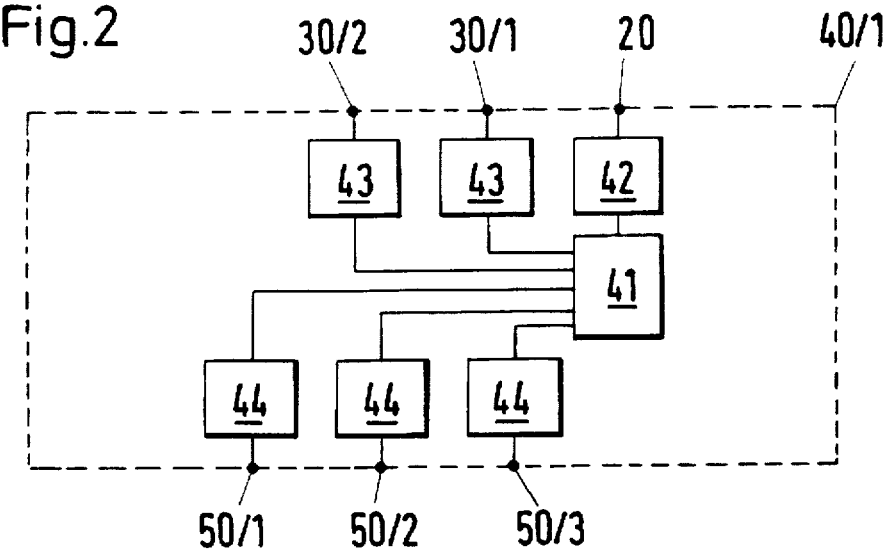
FIG. 2 shows a block circuit diagram of a central processing unit.

In FIG. 2, a block circuit diagram of the central processing unit 40/1 is shown as an example of a central processing unit 40. A main component of this central processing unit 40 is the computer core 41, to which in each case one system bus controller 42 is connected. The system bus controller 42 is connected with the system bus 20. Furthermore, the lateral bus controller 43 and the I/O bus controller 44 are connected to the computer core 41.

For the central processing unit 40/1 shown in FIG. 2, two identical lateral bus controllers 43, to each of which one of the lateral buses 30/1 and 30/2 is connected, and three identical I/O bus controllers 44 are scheduled, to each of which one of the I/O buses 50/1 to 50/3 is connected.

The central processing unit 40/2 (compare FIG. 1) has two lateral bus controllers 43 for the connection to the lateral buses 30/1 and 30/2. However, only one I/O bus controller 44 is required for the connection to the I/O bus 60.

The central processing unit 40/3 (compare FIG. 1) has a lateral bus controller 43 for the connection to the lateral bus 30/1 and two I/O bus controllers 44, to each of which one of the I/O buses 70/1 and 70/2 is connected.

Figure 3:
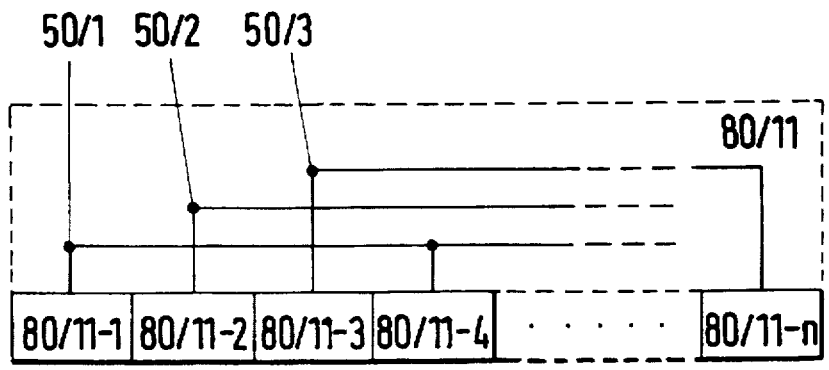
FIG. 3 shows a block circuit diagram of an input/output device.

FIG. 3 shows the I/O device 80/11 as an example of a first variant of a block circuit diagram of an I/O device 80. The I/O device 80/11 has n connection units 80/11-1 to 80/11-n for connecting sensors and actuators, which are not shown, and is connected to three I/O buses 50/1 to 50/3. According to FIG. 3, each of the connection units 80/11-1 to 80/11-n is connected to one of the I/O buses 50/1 to 50/3. Preferably, the connection units 80/11-1 to 80/11-n are distributed uniformly over the I/O buses 50/1 to 50/3. For example, each third connection unit can be connected to the same I/O bus.

Depending on the process and on the volume of data to be transferred, it may also be advantageous to distribute the connection units 80/11-1 to 80/11-n non-uniformly over the I/O buses 50/1 to 50/3.

In each case, each connection unit 80/11-1 to 80/11-n is permanently allocated to one of the I/O buses 50/1 to 50/3.

Figure 4:
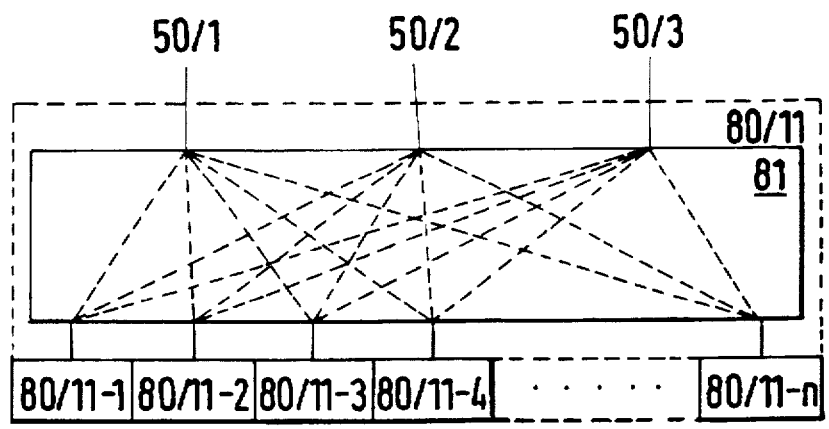
FIG. 4 shows a block circuit diagram of an input/output device with a coupling field.

In a further development of the invention shown in FIG. 4, an I/O device 80/11 is shown as a second variant of a block circuit diagram of an I/O device 80. The I/O device has (unchanged) n connection units 80/11-1 to 80/11-n for connecting it to sensors and actuators, which are not shown, and is connected to three I/O buses 50/1 to 50/3. Furthermore, however, the I/O device 80/11 is equipped with a coupling field 81, to which all I/O buses 50/1 to 50/3 and all connection units 80/11-1 to 80/11-n are connected. Each I/O bus 50/1 to 50/3 can be connected over this coupling field 81 with each connection unit 80/11-1 to 80/11-n.

Accordingly, it is possible to transfer data over each of the connected I/O buses 50/1 to 50/3 from and to each connection unit 80/11-1 to 80/11-n.

This embodiment is particularly advantageous for the transfer of time-critical data, because high priority bus demands of the connection units 80/11-1 to 80/11-n can be distributed over the number of I/O buses 50/1 to 50/3 that are connected.

Within the scope of constructive designs of stored program controls, logical operational units are combined physically into modular units, which are disposed in a vascular system. For stored program controls, component carriers are preferably provided, which are equipped with a series of physical, modular units. Each component carrier has a number of slots, which are equipped with different physical components, depending on the logical function allocated to it. In one realized embodiment, component carriers for the 19 inch mounting technique (DIN 41494, Part 1) are provided with, in each case, 10 slots. Advisably, control units 35 and I/O devices 80 are provided as physical, modular units.

Figure 5:
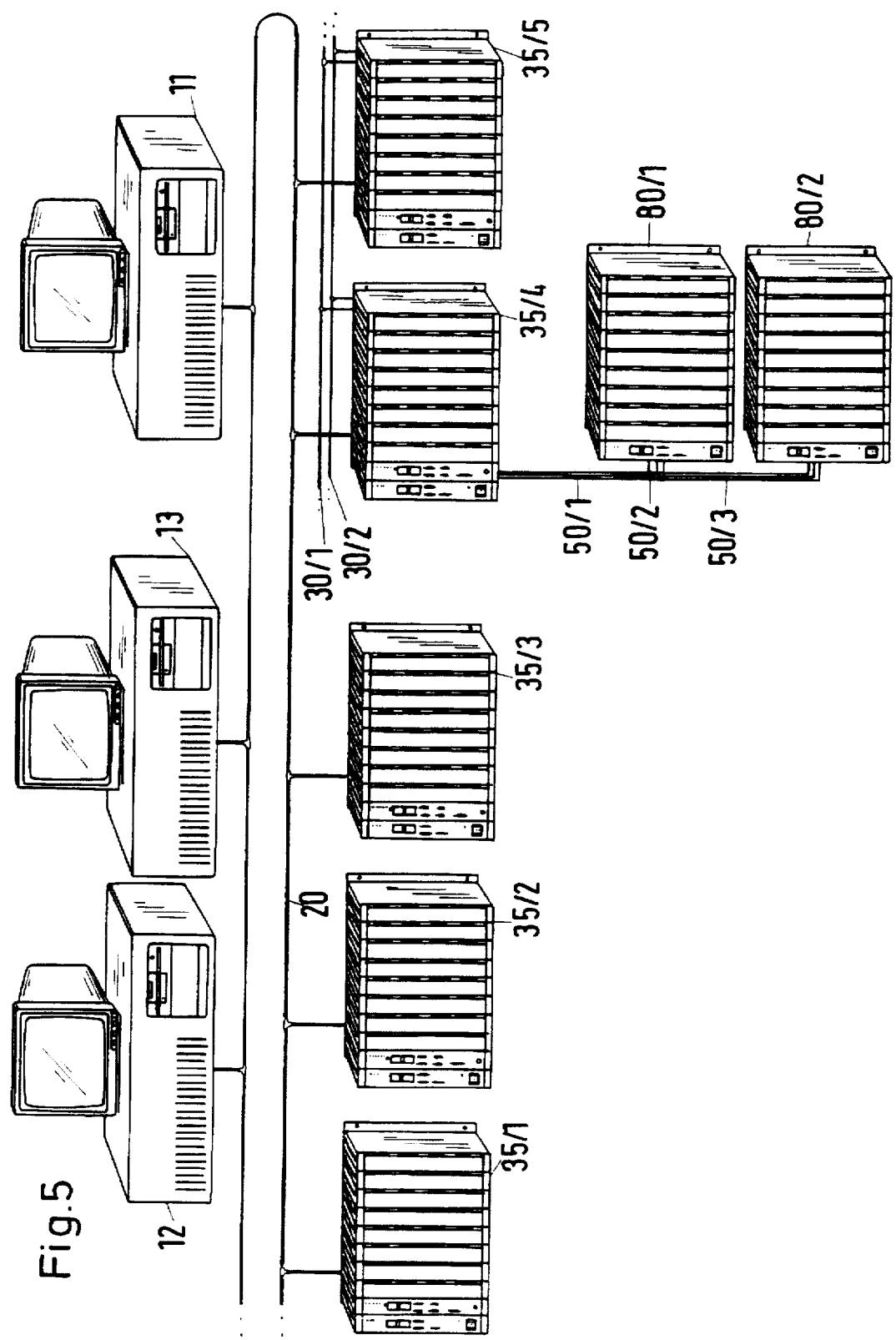
FIG. 5 shows a representation of a constructive design of the invention.

FIG. 5 shows a stored program control, which consists of five control units 35/1 to 35/5, which are linked over a system bus 20 in one configuration device 11 and two combined control and observation devices 12, 13. The control units 35/4 and 35/5 are, moreover, connected with one another over two lateral buses 30/1 and 30/2. Two I/O devices 80/1 and 80/2 are connected over three I/O buses 50/1 to 50/3 to the control unit 35/4.

Figure 9:
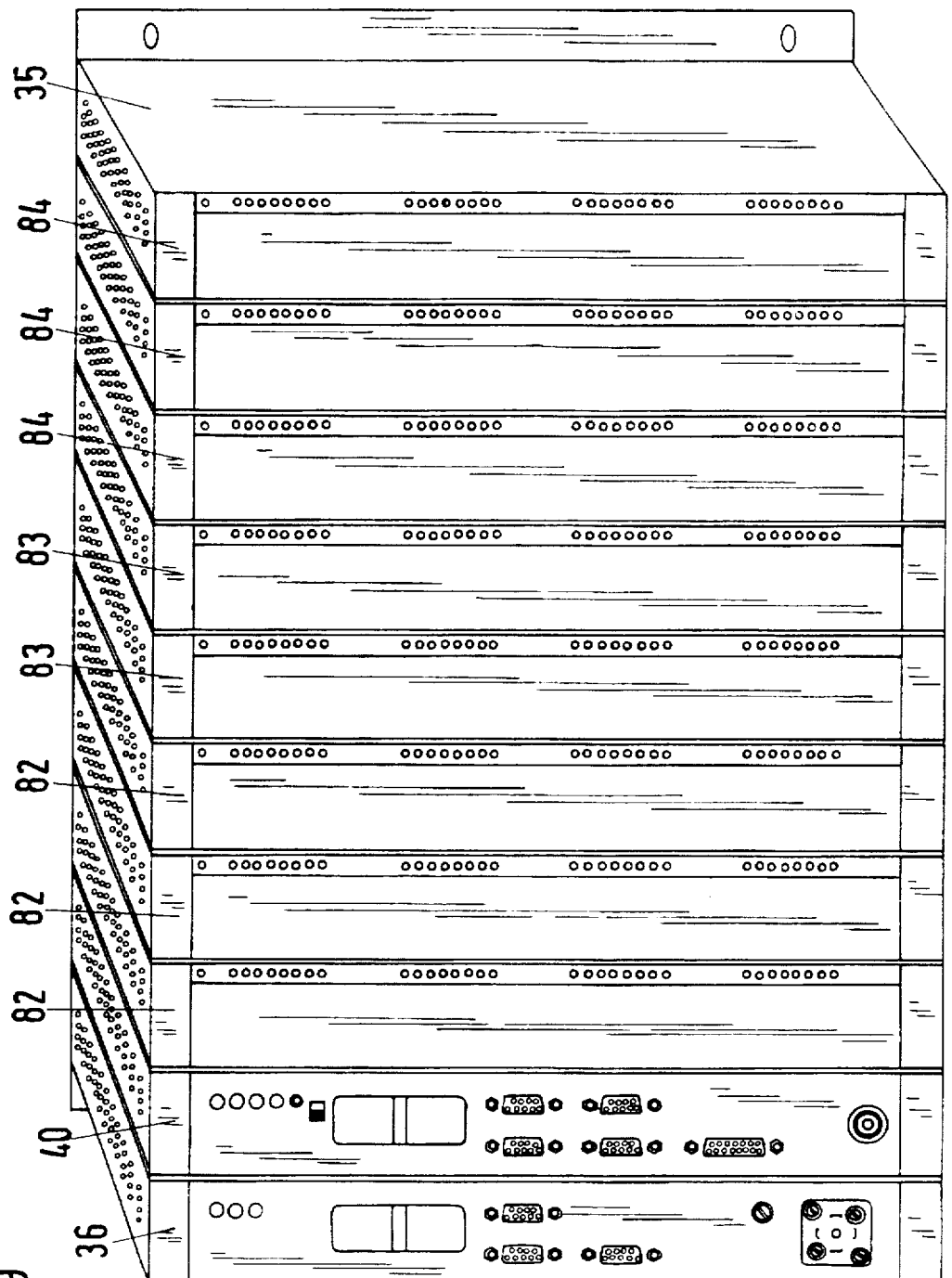
FIG. 9 shows a constructive design of a central modular unit.

Each control unit 35/1 to 35/5 has, according to FIG. 9, a connection component 36, a central processing unit 40, as well as eight connection units. The control unit 35 shown in FIG. 9 has, for example, three analog output connection units 82, two digital output connection units 83 and three digital input connection units 84, to which, in each case, actuators or sensors can be connected.

The control unit 35 is provided with energy over the connection component 36. Moreover, for the connection of the I/O devices 80, the I/O buses 50/1 to 50/3 are connected over the connection component 35 to the central processing unit 40.

The connection units 82, 83 and 84, which are physically allocated to the control device 35, are a logical I/O device 80, shown in FIG. 1 and connected over I/O buses 50/1 to 50/3 with the central processing unit 40.

With permanent allocation of three I/O buses 50/1 to 50/3 to the connection units 82, 83 and 84 and with uniform transfer of data from or to the central processing unit 40, two I/O buses 50/1 and 50/2 are allocated, in each case, to three connection units, for example, the three analog output connection units 82 are allocated to the I/O bus 50/1 and the three digital input connection units 84 are allocated to the I/O bus 50/2 and the two remaining connection units, for example, the two digital output connection units 83 are allocated to the third I/O bus 50/3. In principle, the allocation of the I/O buses 50/1 to 50/3 to the connection units 82, 83 and 84 can be selected freely depending on the process.

Figure 10:
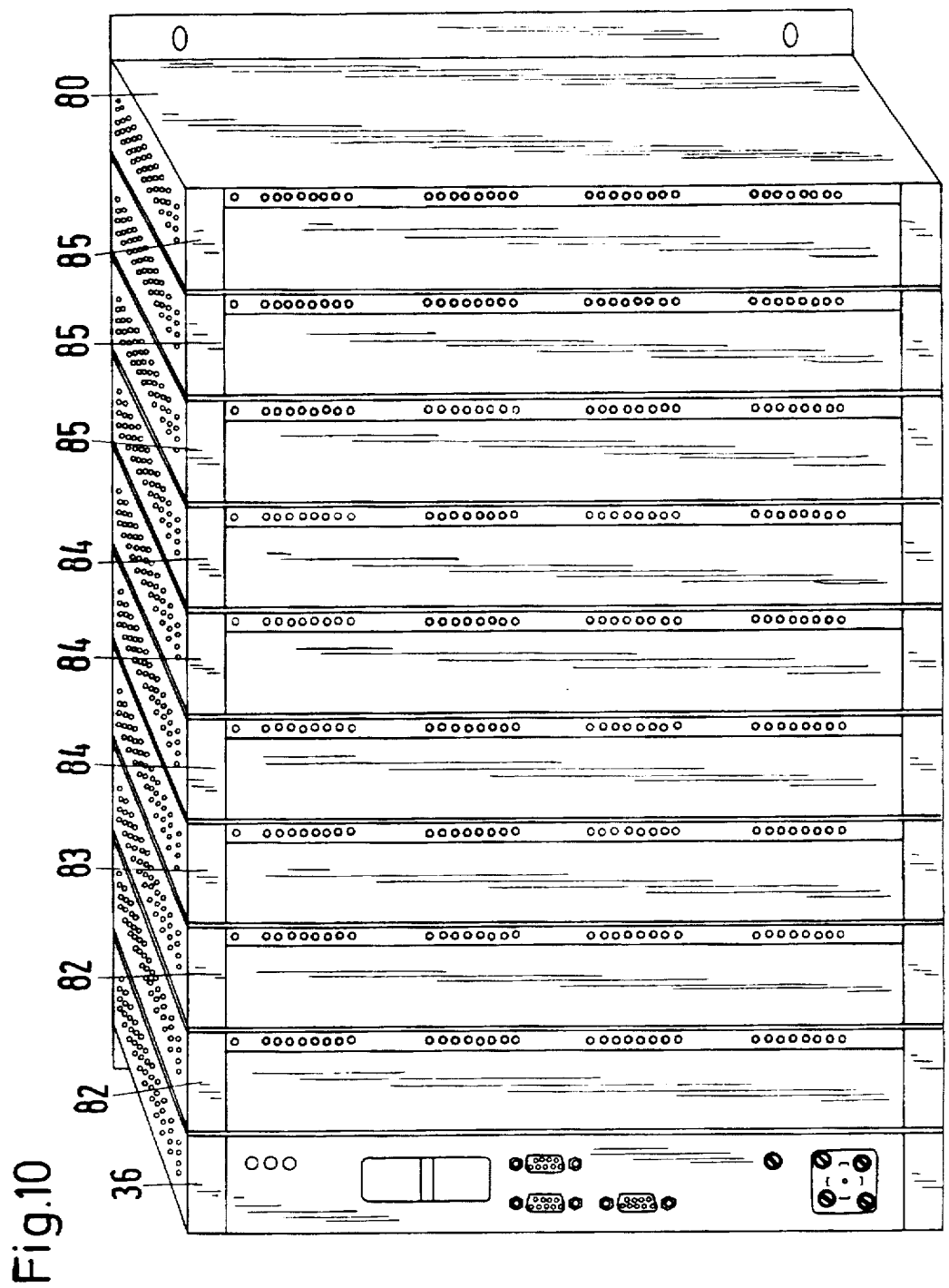
FIG. 10 shows a constructive design of a peripheral modular unit.

To expand the stored program control, I/O devices 80/1 and 80/2 are provided in FIG. 5, which form physically offset modular units. According to FIG. 10, each of these I/O devices 80/1 and 80/2 has a connection component 36 and nine connection units. In FIG. 10, two analog output connection units 82, one digital connection unit 83, three digital input connection units 84 and three analog input connection units 85 are shown. The I/O buses 50/1 to 50/3 are taken to the connection component 36. From the connection component 36, the I/O buses 50/1 to 50/3 are divided among the connection units 82 to 85.

In the case of three I/O buses 50/1 to 50/3 and with a uniform transfer of data from and to the central processing unit 40, in each case three connection units can be allocated to one I/O bus. For example, the output connection units 82 and 83 are connected to the I/O bus 50/1, the digital input connection units 84 are connected to the I/O bus 50/2 and the analog input connection units 85 are connected to the third I/O bus 50/3.

Figure 6:
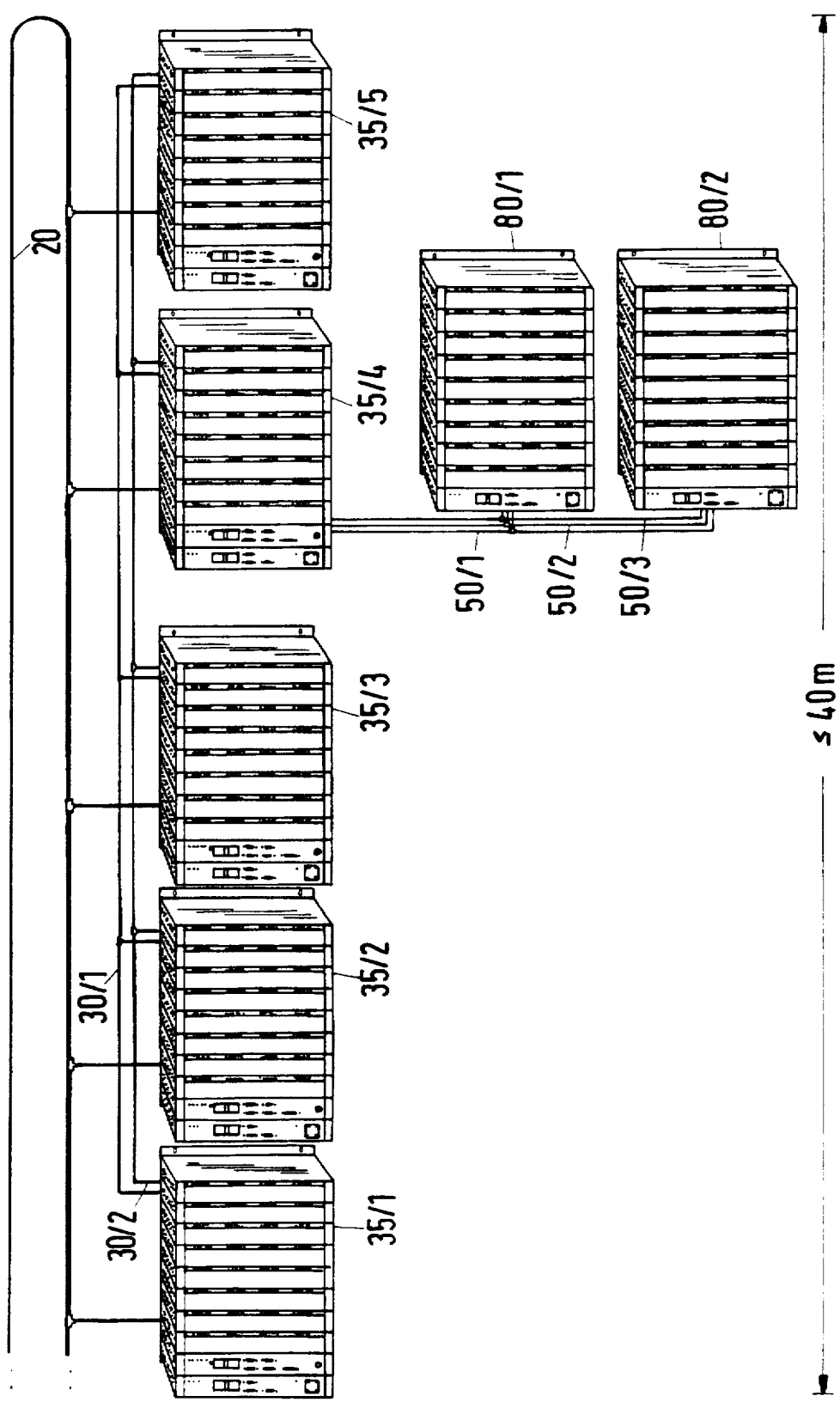
FIG. 6 shows a representation of an effective transfer system.

A further refinement of the invention is shown in FIG. 6. Five control units 35/1 to 35/5 are provided, each of which is connected to the system bus 20 as well as to two lateral buses 30/1 and 30/2. Two I/O devices 80/1 and 80/2 are connected over three I/O buses 50/1 to 50/3 to one of the control units 35/1 to 35/5, in this case to control unit 35/4. It is, however, also possible to expand any other control unit 35/1 to 35/3 and 35/5 in a process-specific manner with offset I/O devices 80. Bus systems of the CAN standard, corresponding to the draft of the ISO/DIS Standard 11898, are provided as lateral buses 30/1 and 30/2, so that the control units 35/1 to 35/5 can be disposed regionally separated up to a total cable length of the lateral buses 30/1 and 30/2 of, in each case, 40 m.

Figure 7:
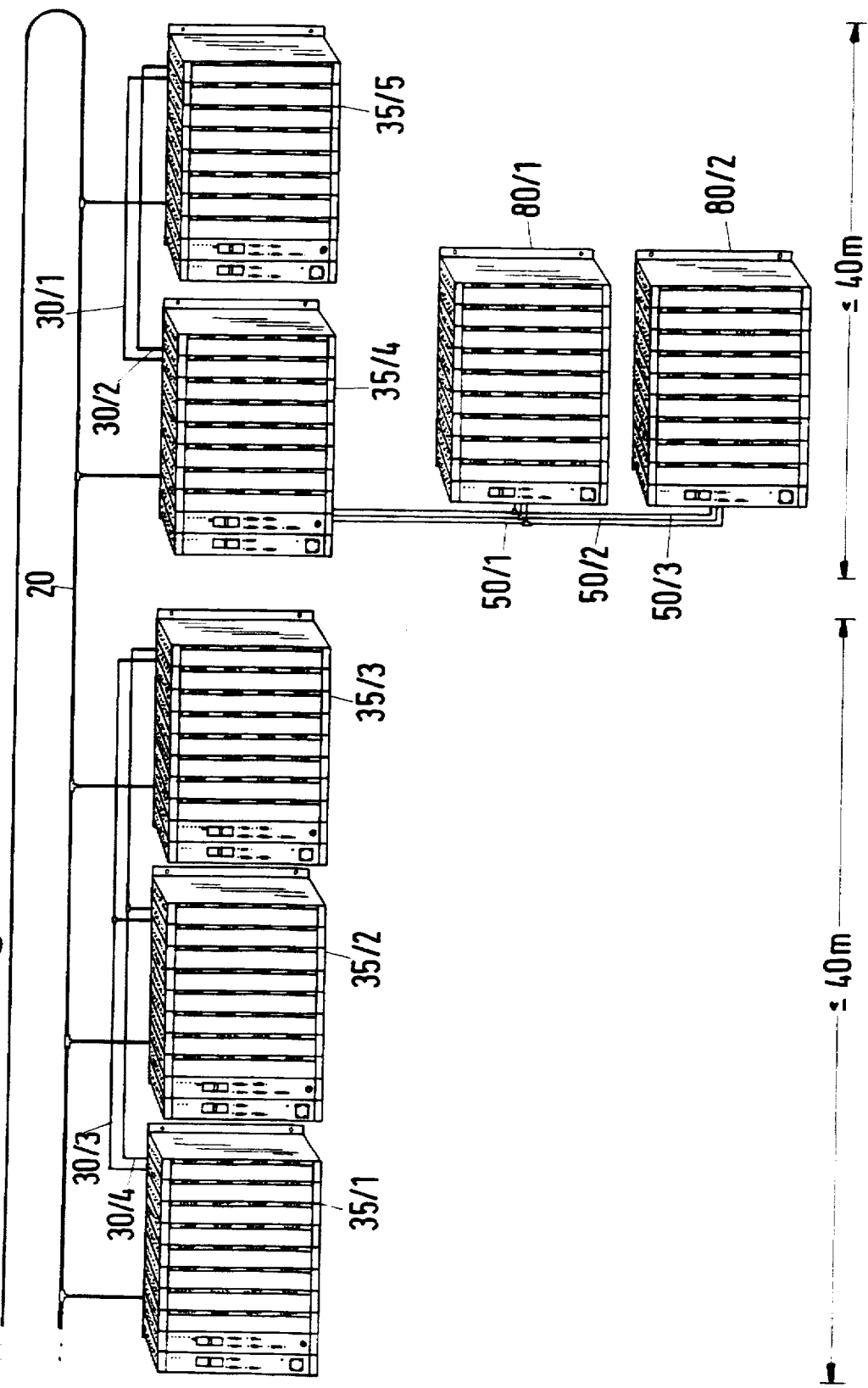
FIG. 7 shows a representation of a variation of the transfer system.

In a further development of the invention shown in FIG. 7, the control unit 35/1 to 35/5, which is connected to a system bus 20, is divided into groups. Each group of control units is controlled separately over mutually separated lateral buses. As shown in FIG. 7, a first group is formed from the control unit 35/1 to 35/3, which are connected to the lateral buses 30/3 and 30/4. A second group is formed by the control unit 35/4 and 35/5, which are connected to the lateral buses 30/1 and 30/2. When bus systems of the CAN standard are used for the lateral buses 30/1 to 30/4, the control unit 35/1 to 35/3 as well as 35/4 and 35/5, which are connected groupwise to the respective lateral bus, can be separated from one another up to a cable length of, in each case, 40 m.

As shown by the example of the control unit 35/4, each control unit 35/1 to 35/5 can be expanded by external I/O devices 80/1 and 80/2, which are connected over I/O buses 50/1 to 50/3 to the respective control element 35/1 to 35/5. The additional distance between the groups of control units 35/1 to 35/3 as well as 35/4 and 35/5 is determined by the bus system of the system bus used.

Figure 8:
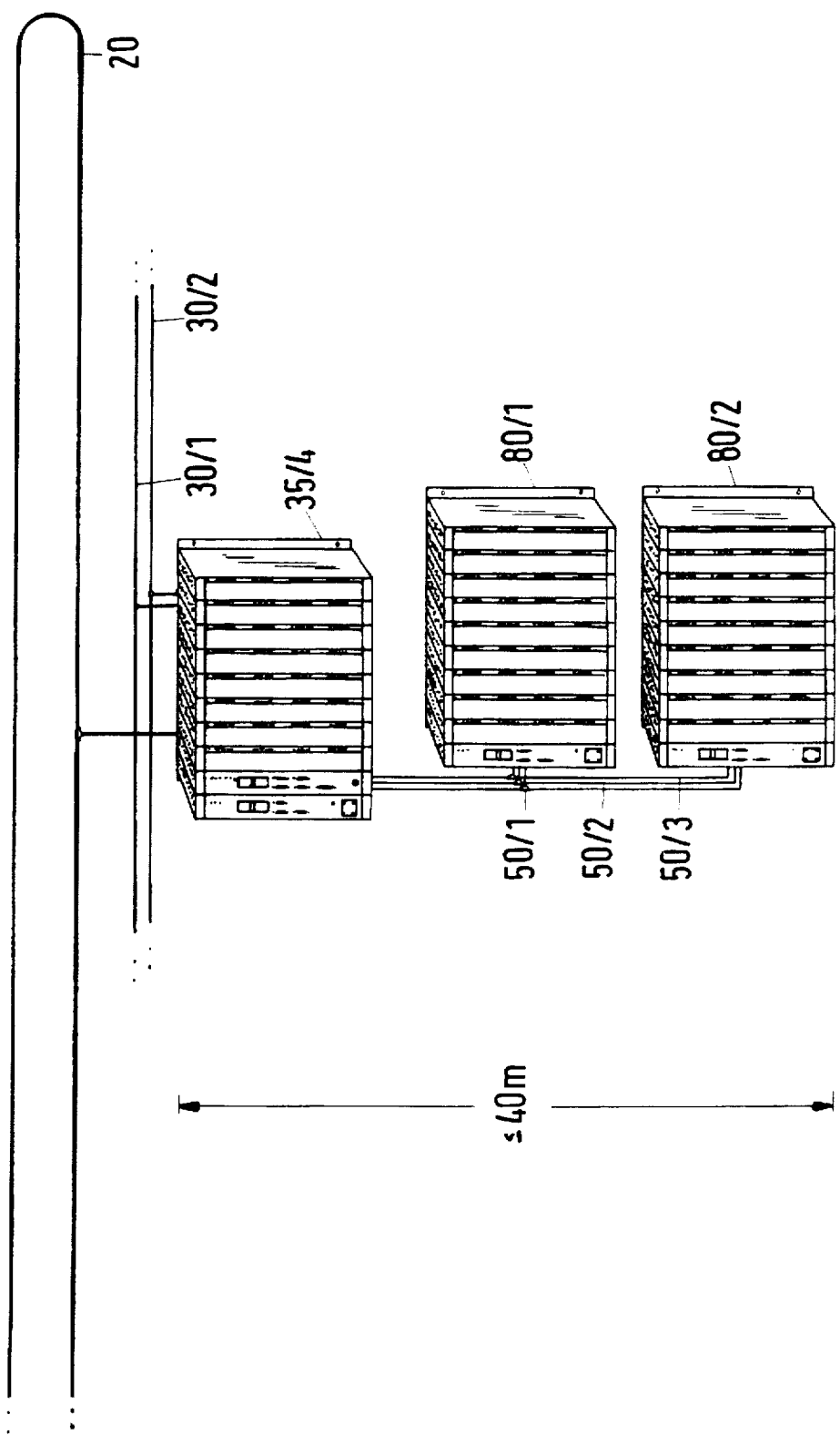
FIG. 8 shows a representation of the input/output bus structure.

In FIG. 8, a control unit 35/4 is shown, which is connected to a system bus 20 and two lateral buses 30/1 and 30/2. The control unit 35/4 is connected over three I/O buses 50/1 to 50/3, which are arranged in parallel, with two offset I/O devices 80/1 and 80/2. The I/O buses 50/1 to 50/3 are bus systems with priority-persistent access methods. Preferably, bus systems specified in the CAN standard are used. Advantageously, the I/O devices 80/1 and 80/2, allocated to a control unit 35/4, can be placed at a distance of up to 40 m from the control unit 35/4, corresponding to the total cable length for the respective I/O buses 50/1 to 50/3.

The invention is not limited by the embodiments described above which are presented as examples only but can be modified in various ways within the scope of protection defined by the appended patent claims.

We claim:

1. A transfer system for data exchange between dispersed devices in stored program controls for process control, comprising: devices for configuring, controlling and observing the process, disposed in a remote control area; at least two active central processing units; at least one active input/output device connected to each central processing unit; a serial system bus having a non-persistent access behavior and directly connecting the central processing units to the devices for configuring, controlling and observing, which are disposed in the remote control area; at least one lateral bus with priority-persistent access behavior to which the at least two central processing units are connected so that the central processing units are directly connected together parallel to the system bus; a plurality of input/output buses, with priority persistent access behavior, at least one of the input/output buses with priority-persistent access behavior being respectively connected to each of the central processing units and to at least one said input/output device, each input/output device having a number of connection units which are connectable with at least one of the input/output buses; and sensors and actuators connected to the connection units.

2. The transfer system of claim 1, wherein the central processing units are divided into groups, at least one separate lateral bus being allocated to each group, at which lateral bus the central processing units of the respective groups are connected.

3. The transfer system of claim 1, wherein each of the connection units is allocated to an input/output bus.

4. A transfer system as defined in claim 1, wherein each of the connection units of each input/output device is connectable with each input/output bus connected to the input/output device.

* * * * *